(12) United States Patent
Zhao

(10) Patent No.: US 11,209,267 B2
(45) Date of Patent: Dec. 28, 2021

(54) APPARATUS FOR IDENTIFYING AND ASSESSING SURFACE VARIATIONS AND DEFECTS IN A PRODUCT FROM MULTIPLE VIEWPOINTS

(71) Applicant: HONGFUJIN PRECISION ELECTRONICS(TIANJIN)CO.,LTD., Tianjin (CN)

(72) Inventor: Qiao-Zhong Zhao, Tianjin (CN)

(73) Assignee: HONGFUJIN PRECISION ELECTRONICS(TIANJIN)CO., LTD., Tianjin (CN)

( * ) Notice: Subject to any disclaimer, the term of this patent is extended or adjusted under 35 U.S.C. 154(b) by 142 days.

(21) Appl. No.: 16/454,172

(22) Filed: Jun. 27, 2019

(65) Prior Publication Data

US 2020/0049495 A1 Feb. 13, 2020

(30) Foreign Application Priority Data

Aug. 10, 2018 (CN) .......................... 201810914334.8

(51) Int. Cl.
```
G01B 11/30      (2006.01)
G01N 21/01      (2006.01)
G01B 11/24      (2006.01)
G01N 21/03      (2006.01)
```
(52) U.S. Cl.
CPC ............ *G01B 11/303* (2013.01); *G01B 11/24* (2013.01); *G01N 21/01* (2013.01); *G01N 2021/0112* (2013.01); *G01N 2021/0339* (2013.01)

(58) Field of Classification Search
CPC .............. H01L 21/677; H05K 13/0069; H05K 2203/16; H05K 2203/167
See application file for complete search history.

(56) References Cited

U.S. PATENT DOCUMENTS

| | | | | |
|---|---|---|---|---|
| 4,750,605 | * | 6/1988 | Brems .................... | B65G 25/02 198/456 |
| 4,850,472 | * | 7/1989 | Liebel .................... | B65G 37/02 198/409 |
| 5,113,995 | * | 5/1992 | Sakurai ................. | B65H 67/065 198/409 |

(Continued)

FOREIGN PATENT DOCUMENTS

| | | |
|---|---|---|
| CN | 204330609 | 5/2015 |
| CN | 107132230 | 9/2017 |

(Continued)

*Primary Examiner* — Kara E. Geisel
*Assistant Examiner* — Jarreas C Underwood
(74) *Attorney, Agent, or Firm* — ScienBiziP, P.C.

(57) ABSTRACT

An apparatus to detect the topology of a workpiece including surface variations and flaws according to images from several viewpoints includes a frame, a loading member, a robot, an image capturing mechanism, and a controller. The loading member is positioned on the frame and loads a workpiece. The controller controls the robot to drive the image capturing mechanism to move or rotate to different preset positions from each of which the image capturing mechanism can capture images of the workpiece and transmit the images to the controller. The controller further processes the images to obtain an assessment of the components and surface of the workpiece for further processing.

16 Claims, 4 Drawing Sheets

(56) References Cited

U.S. PATENT DOCUMENTS

| | | | | |
|---|---|---|---|---|
| 5,568,264 | * | 10/1996 | Nakatsuka | H05K 13/0815 356/394 |
| 5,823,736 | * | 10/1998 | Matsumura | B24B 41/005 414/609 |
| 6,722,642 | * | 4/2004 | Sutton | B25B 11/005 269/21 |
| 7,884,918 | * | 2/2011 | Hattori | G03F 7/70725 355/52 |
| 2002/0050672 | * | 5/2002 | Moncavage | B25B 1/2421 269/266 |
| 2005/0159842 | * | 7/2005 | Ban | B25J 19/023 700/245 |
| 2008/0188983 | * | 8/2008 | Ban | G01B 21/042 700/245 |
| 2013/0342659 | * | 12/2013 | Onishi | G06T 7/70 348/47 |
| 2014/0198185 | * | 7/2014 | Haugen | G01B 11/2545 348/48 |
| 2016/0170076 | * | 6/2016 | Singh | G01V 5/0066 378/57 |

FOREIGN PATENT DOCUMENTS

| | | | |
|---|---|---|---|
| CN | 206818630 | | 12/2017 |
| CN | 206818630 U | * | 12/2017 |
| CN | 207036661 | | 2/2018 |
| TW | 201719155 | | 6/2017 |

* cited by examiner

APPARATUS FOR IDENTIFYING AND ASSESSING SURFACE VARIATIONS AND DEFECTS IN A PRODUCT FROM MULTIPLE VIEWPOINTS

FIELD

The subject matter herein generally relates to quality and consistency control.

BACKGROUND

Surface-mounting technology is a commonly used process in the electronics assembly industry. However, in production, defects may arise during assembly. For example, when components are assembled to a PCB, the height of a component may not be within a normal distance. The PCB may have bumps and other defects during transportation. Manual inspection can be carried out, but that is less efficient and has a higher risk of loss.

Therefore, there is room for improvement within the art.

BRIEF DESCRIPTION OF THE DRAWINGS

Implementations of the present technology will now be described, by way of embodiments with reference to the attached figures.

DETAILED DESCRIPTION

Figure 1:
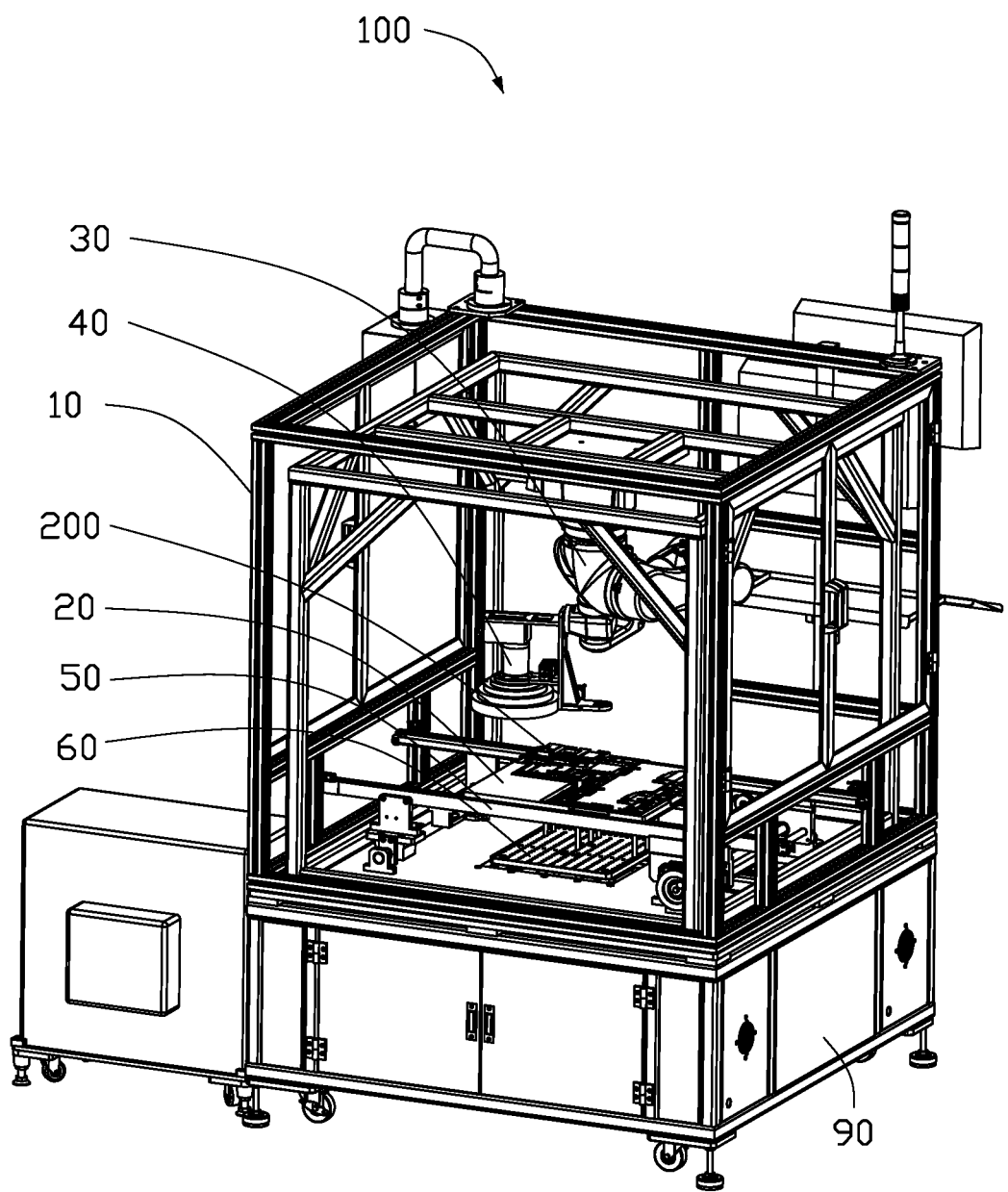
FIG. 1 is an isometric view of an apparatus to detect variations and defects according to an embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to show details and features of the present disclosure better. The disclosure is by way of embodiments and not by way of limitation in the figures of the accompanying drawings, in which like references indicate similar elements. It should be noted that references to "an" or "one" embodiment in this disclosure are not necessarily to the same embodiment, and such references mean "at least one."

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like. The references "a plurality of" and "a number of" mean "at least two."

Figure 2:
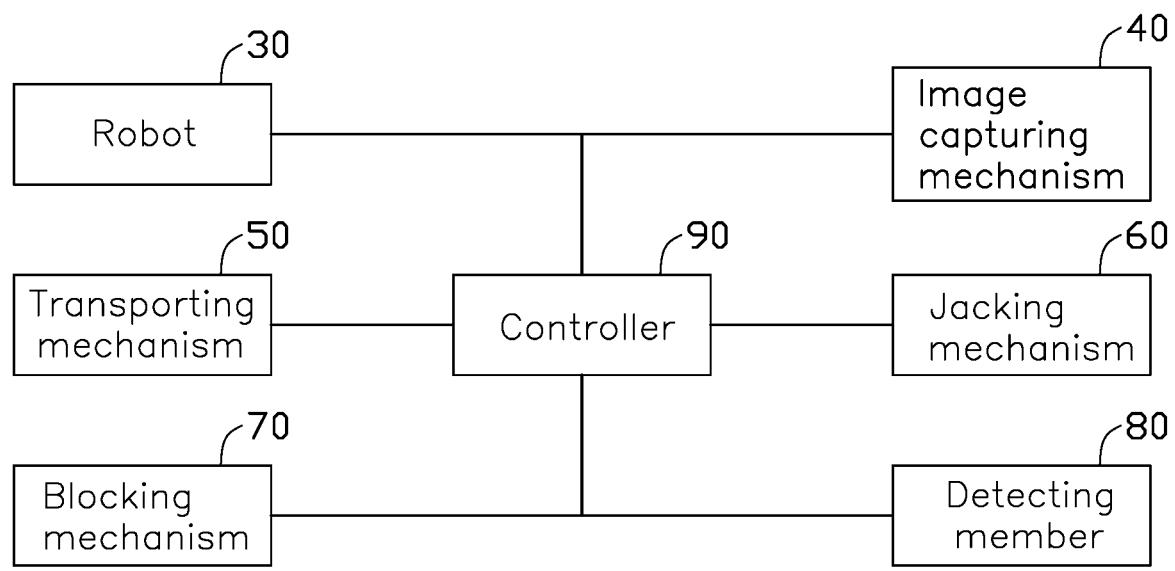
FIG. 2 is a schematic diagram of controller connections to the apparatus in FIG. 1.

FIGS. 1 and 2 illustrate a detecting apparatus 100 according to an embodiment of the present application. The detecting apparatus 100 is configured to detect variations and defects in a workpiece 200 from a plurality of positions. In this embodiment, the workpiece 200 is a PCB board, but is not limited thereto. In other embodiments, the workpiece 200 can also be other assemblies or objects being assembled.

The detecting apparatus 100 includes a frame 10, a loading member 20, a robot 30, an image capturing mechanism 40, a transporting mechanism 50, a jacking mechanism 60, and a controller 90 (not shown). The transporting mechanism 50, the jacking mechanism 60, the robot 30, and the image capturing mechanism 40 are electrically connected to the controller 90. The transporting mechanism 50 is positioned on the frame 10. The loading member 20 is used to load and fix the workpiece 200. The loading member 20 is positioned on the transporting mechanism 50. The transporting mechanism 50 is configured to transport the loading member 20 to a point underneath a position of detection. The jacking mechanism 60 is positioned on the frame 10 and below the loading member 20. The jacking mechanism 60 is configured to pass through the transporting mechanism 50 and lifting the loading member 20 up to the detection position. The robot 30 is positioned on the frame 10 and above the loading member 20. The image capturing mechanism 40 is positioned at an end of the robot 30. The robot 30 is configured to drive the image capturing mechanism 40 to move or rotate to reposition the image capturing mechanism 40 to a plurality of preset angles, for inspection of the workpiece 200. The image capturing mechanism 40 captures images of the workpiece 200 and transmits the images to the controller 90. The controller 90 processes the images to identify and assess the surface of the workpiece 200 from its appearance.

In this embodiment, the inspectable parts of the workpiece 200 include a first surface facing the robot 30 and a second surface beside the first surface. The robot 30 is a six-axis robot, but is not limited thereto. In other embodiments, when the surface to be inspected of the workpiece 200 includes only the first surface facing the robot 30, the robot 30 can be a four-axis robot.

Figure 3:
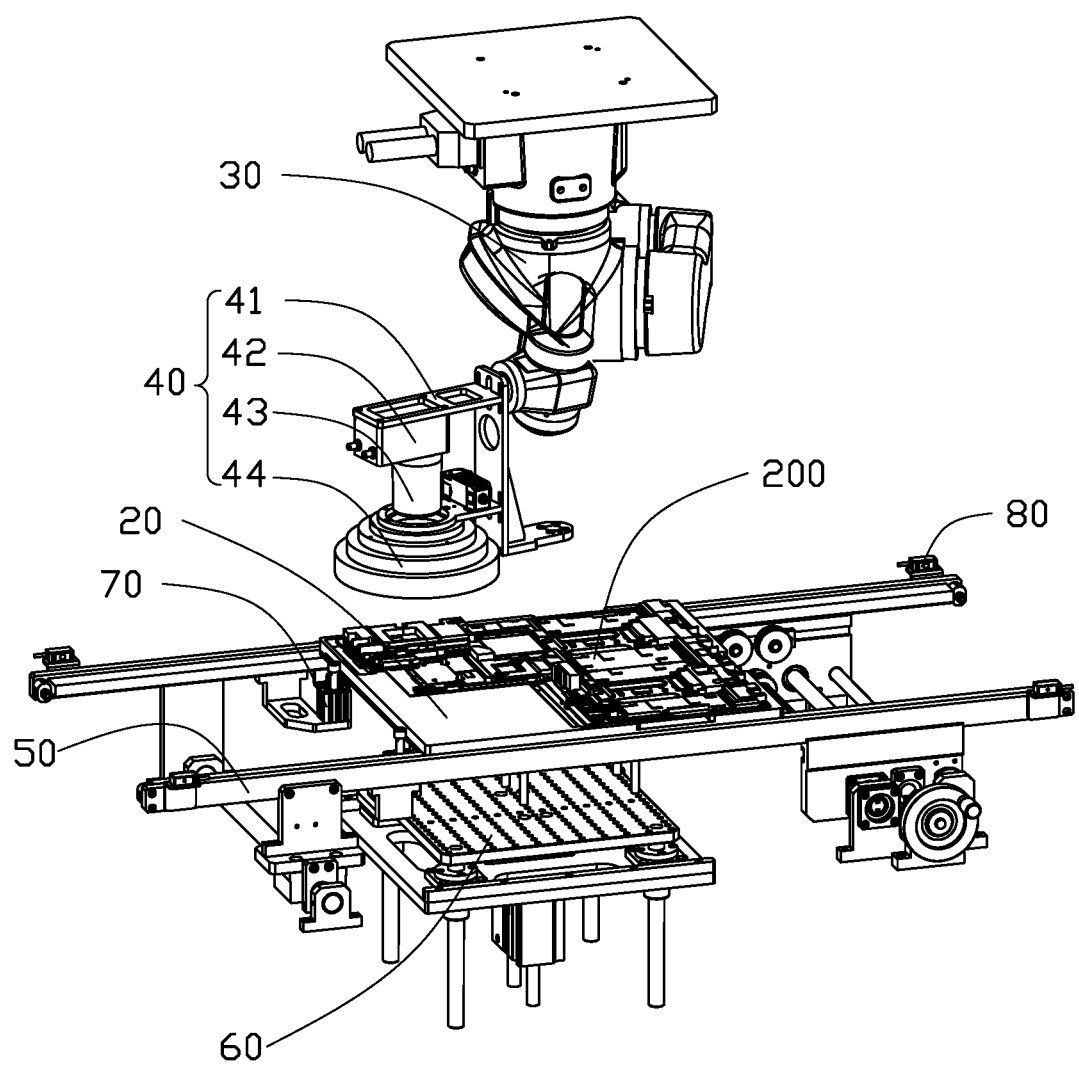
FIG. 3 is similar to FIG. 1, but a frame is omitted.

Referring to FIG. 3, the image capturing mechanism 40 includes a connecting bracket 41, an industrial camera 42, a lens 43, and an annular light source 44. The connecting bracket 41 is positioned at the end of the robot 30. The industrial camera 42 and the annular light source 44 are positioned on the connecting bracket 41. The annular light source 44 is positioned on a side of the industrial camera 42 that faces the loading member 20. The annular light source 44 is configured to illuminate the workpiece 200. The lens 43 is positioned on the industrial camera 42 and positioned between the industrial camera 42 and the annular light source 44. The industrial camera 42 is electrically connected to the controller 90. The industrial camera 42 captures images of the workpiece 200 and transmits the images to the controller 90.

Figure 4:
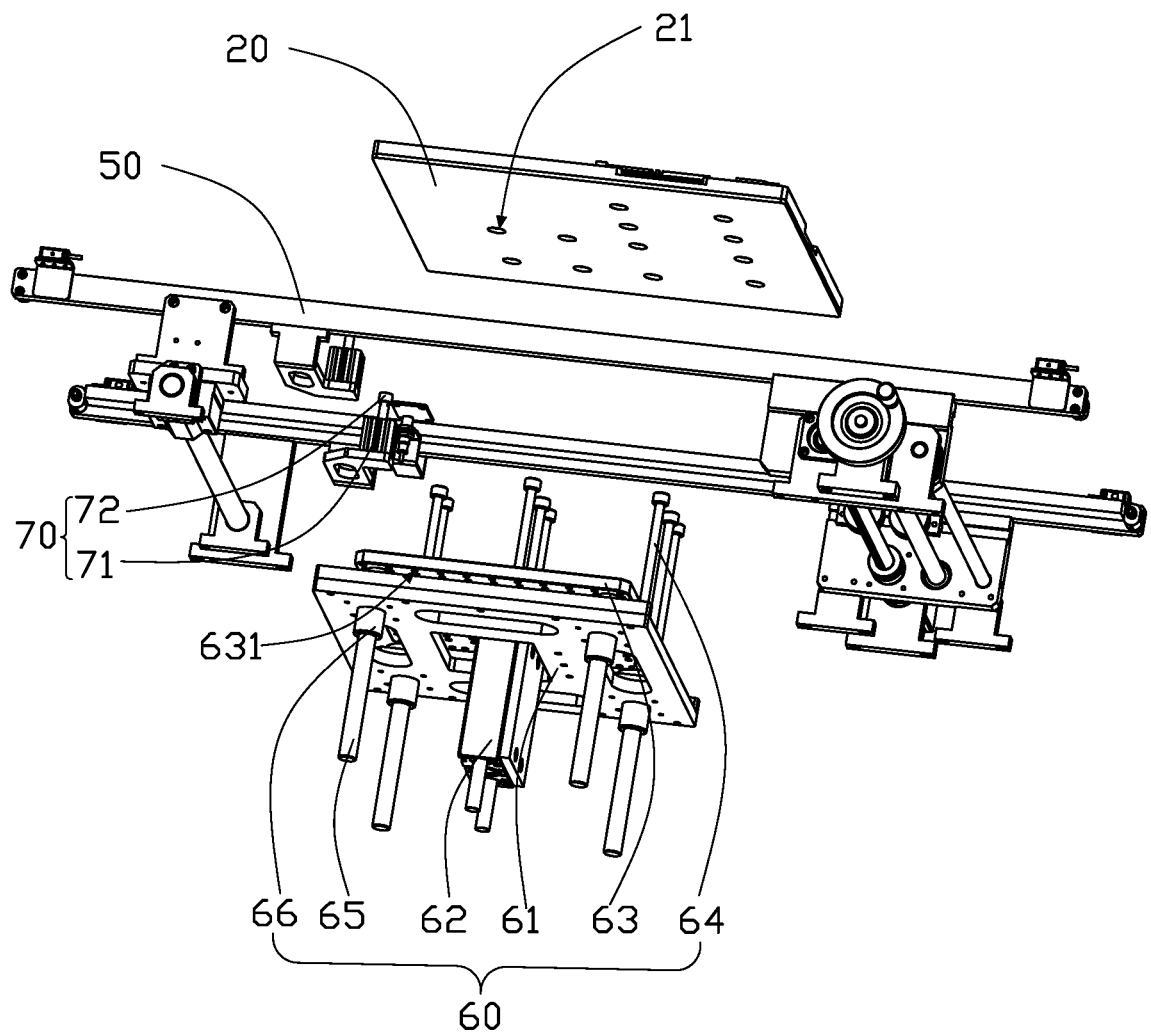
FIG. 4 is an exploded isometric view of a transporting mechanism, a jacking mechanism, and a loading member of the apparatus shown in FIG. 1.

Referring to FIG. 4, the jacking mechanism 60 includes a supporting member 61, a driving member 62, a seat plate 63, and a plurality of poles 64. The supporting member 61 is positioned on the frame 10. The jacking drive member 62 is positioned on the supporting member 61. The seat plate 63 is coupled to the driving member 62 and is positioned on a side of the driving member 62 that faces the loading member 20. One end of each pole 64 is positioned on the seat plate 63, and the other end of each pole 64 is free. The driving member 62 is electrically connected to the controller 90. The controller 90 controls the driving member 62 to drive the seat plate 63 and the plurality of poles 64 against the loading member 20, to move the loading member 20 to the detection position. At this time, the loading member 20 is separated from the transporting mechanism 50 and positioned above the transporting mechanism 50, providing a larger space for movement of the robot 30, to drive the image capturing mechanism 40 to the second surface of the workpiece 200.

In the embodiment, the loading member 20 defines a plurality of positioning holes 21. Free end of each pole 64 can be inserted into a positioning hole 21, for precise orientation and movement of the loading member 20.

In the embodiment, the seat plate 63 defines a plurality of mounting holes 631. Each pole 64 is inserted into a mounting hole 631. Fasteners (not shown) pass through the mounting holes 631 to secure the poles 64 to the seat plate 63.

The jacking mechanism 60 further includes a plurality of guiding rods 65 and a plurality of guiding sleeves 66. Each of the guiding sleeves 66 is positioned on the supporting member 61. One end of each guiding rod 65 is positioned on the seat plate 63, and the other end of each guiding rod 65 is slidably positioned on a guiding sleeve 66.

Referring to FIG. 3 and FIG. 4, the appearance detecting device 100 further includes a blocking mechanism 70 and two detecting units 80. The blocking mechanism 70 and the two detecting units 80 are electrically connected to the controller 90. The blocking mechanism 70 and the detecting units 80 are positioned on the transporting mechanism 50. The two detecting units 80 are positioned at ends of the transporting mechanism 50 to detect and report loading and unloading of the workpiece 200. The blocking mechanism 70 is configured to block the loading member 20 on the transporting mechanism 50.

In the embodiment, the blocking mechanism 70 includes a main body 71 and an output shaft 72. The main body 71 is electrically connected to controller 90. When one detecting unit 80 detects the loading of workpiece 200, the controller 90 controls the main body 71 to extend out of the output shaft 72 to block the loading member 20 on the transporting mechanism 50.

In the embodiment, the blocking mechanism 70 is a cylinder, and electrically powered.

In operation, the transporting mechanism 50 transports the loading member 20 and the workpiece 200 to the point below the detection position. A detecting unit 80 detects the presence of the workpiece 200, and the controller 90 controls the main body 71 to extend out of the output shaft 72 to block the loading member 20 on the transporting mechanism 50. Then, the driving member 62 is controlled to drive the seat plate 63 and the plurality of poles 64 upwards until the loading member 20 and the workpiece 200 are transferred to the detection position. Next, the robot 30 is controlled to move or rotate to an angle aligned with one of the inspectable parts or positions. The industrial camera 42 is controlled to capture an image of the workpiece 200 and transmit the image to the controller 90. The controller 90 analyzes the image for surface flaws and variations relative to the viewing angle applied to the workpiece 200. The robot 30 is then controlled to move or rotate to position the image capturing mechanism 40 at another angle aligned with another inspectable part or position. The previous step is repeated until images of all of the inspectable parts or positions of the workpiece 200 have been captured by the mechanism 40. The driving member 62 is finally controlled to lower the loading member 20 onto the transporting mechanism 50, while the controller 90 controls the main body 71 to retract the output shaft 72. The transporting mechanism 50 transports the loading member 20 and the workpiece 200 to a machining position, or a position for other processing following the assessment of the workpiece 200. The detecting unit 80 detects the workpiece 200 at the machining position and reports to the controller 90. The identification and assessment of the workpiece 200 is completed.

The transporting mechanism 50 can be omitted, the loading member 20 can be directly placed on the pole 64 of the jacking mechanism 60.

The transporting mechanism 50 and the jacking mechanism 60 can be omitted together, the loading member 20 can be directly placed on the frame 10.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A detecting apparatus configured to detect variations and defects in a workpiece from a plurality of positions, the detecting apparatus comprising:

a frame;

a loading member positioned on the frame and configured to load and fix the workpiece;

a robot positioned on the frame and above the loading member;

an image capturing mechanism fixed on the robot;

a controller electrically connected to the image capturing mechanism and the robot, wherein the controller controls the robot to drive the image capturing mechanism to move or rotate to reposition the image capturing mechanism to a plurality of preset angles for inspection of the workpiece, and controls the image capturing mechanism to capture images of the workpiece at each position to be inspected and transmit the images to the controller, the controller further processes the images to identify and assess the surface of the workpiece according to the images of the workpiece;

a transporting mechanism positioned on the frame and electronically connected to the controller; and a jacking mechanism positioned on the frame and electronically connected to the controller;

wherein the loading member is positioned on the transporting mechanism, the jacking mechanism is positioned below the loading member, the transporting mechanism transports the loading member to a point below a detection position, the jacking mechanism passes through the transporting mechanism and lifting the loading member up to the detection position;

wherein the jacking mechanism comprises a supporting member, a driving member, a seat plate, and a plurality of poles, the supporting member is positioned on the frame, the jacking drive member is positioned on the supporting member, the seat plate is coupled to the driving member and is positioned on a side of the driving member that faces the loading member, one end of each pole is positioned on the seat plate, and the other end of each pole is free, the driving member is electrically connected to the controller, the controller controls the driving member to drive the seat plate and the plurality of poles to move to make the plurality of poles to drive the loading member to the detection position.

2. The detecting apparatus of claim 1, wherein the image capturing mechanism comprises a connecting bracket, an industrial camera, a lens, and an annular light source, wherein the connecting bracket is positioned at the end of the robot, the industrial camera and the annular light source are positioned on the connecting bracket, the annular light source is positioned on a side of the industrial camera that faces the loading member, the lens is positioned on the industrial camera and positioned between the industrial camera and the annular light source.

3. The detecting apparatus of claim 1, further comprising:
a blocking mechanism electrically connected to the controller; and
two detecting units electrically connected to the controller;
wherein the blocking mechanism and the detecting unit are positioned on the transporting mechanism, the two detecting units are positioned at ends of the transporting mechanism to detect and report loading and unloading of the workpiece, the blocking mechanism is configured to block the loading member on the transporting mechanism.

4. The detecting apparatus of claim 3, wherein the blocking mechanism comprises a main body and an output shaft, the main body is electrically connected to controller, when the detecting unit detects the loading of the workpiece, the controller controls the main body to extend out of the output shaft to block the loading member on the transporting mechanism.

5. The detecting apparatus of claim 4, wherein the blocking mechanism is a cylinder and electrically powered.

6. The detecting apparatus of claim 1, wherein the loading member defines a plurality of positioning holes, free end of each pole is inserted into a positioning hole, for precise orientation and movement of the loading member.

7. The detecting apparatus of claim 6, wherein the seat plate defines a plurality of mounting holes, each pole is inserted into a mounting hole.

8. The detecting apparatus of claim 1, wherein the jacking mechanism further comprises a plurality of guiding rods and a plurality of guiding sleeves, each of the guiding sleeves is positioned on the supporting member, one end of each guiding rod is positioned on the seat plate, and the other end of each guiding rod is slidably positioned on corresponding guiding sleeve.

9. A detecting apparatus configured to detect variations and defects in a workpiece from a plurality of positions, the detecting apparatus comprising:
a frame;
a loading member positioned on the frame for loading the workpiece;
a robot;
an image capturing mechanism fixed to an end of the robot;
a controller electrically connected to the image capturing mechanism and the robot, wherein the controller controls the robot to drive the image capturing mechanism to move or rotate to reposition the image capturing mechanism to a plurality of preset angles aligned for inspection of the workpiece, and controls the image capturing mechanism to capture images of the workpiece at each position to be inspected and transmit the images to the controller, the controller further processes the images to identify and assess the surface of the workpiece according to the images of the workpiece;
a transporting mechanism positioned on the frame and electronically connected to the controller; and
a jacking mechanism positioned on the frame and electronically connected to the controller;
wherein the loading member is positioned on the transporting mechanism, the jacking mechanism is positioned below the loading member, the transporting mechanism transports the loading member to a point below a detection position, the jacking mechanism passes through the transporting mechanism and lifting the loading member up to the detection position;
wherein the jacking mechanism comprises a supporting member, a driving member, a seat plate, and a plurality of poles, the supporting member is positioned on the frame, the jacking drive member is positioned on the supporting member, the seat plate is coupled to the driving member and is positioned on a side of the driving member that faces the loading member, one end of each pole is positioned on the seat plate, and the other end of each pole is free, the driving member is electrically connected to the controller, the controller controls the driving member to drive the seat plate and the plurality of poles to move to make the plurality of poles to drive the loading member to the detection position.

10. The detecting apparatus of claim 9, wherein the image capturing mechanism comprises a connecting bracket, an industrial camera, a lens, and an annular light source, wherein the connecting bracket is positioned at the end of the robot, the industrial camera and the annular light source are positioned on the connecting bracket, the annular light source is positioned on a side of the industrial camera that faces the loading member, the lens is positioned on the industrial camera and positioned between the industrial camera and the annular light source.

11. The detecting apparatus of claim 9, further comprising:
a blocking mechanism electrically connected to the controller; and
two detecting units electrically connected to the controller;
wherein the blocking mechanism and the detecting unit are positioned on the transporting mechanism, the two detecting units are positioned at ends of the transporting mechanism to detect and report loading and unloading of the workpiece, the blocking mechanism is configured to block the loading member on the transporting mechanism.

12. The detecting apparatus of claim 11, wherein the blocking mechanism comprises a main body and an output shaft, the main body is electrically connected to controller, when the detecting unit detects the loading of the workpiece, the controller controls the main body to extend out of the output shaft to block the loading member on the transporting mechanism.

13. The detecting apparatus of claim 12, wherein the blocking mechanism is a cylinder and electrically powered.

14. The detecting apparatus of claim 9, wherein the loading member defines a plurality of positioning holes, free end of each pole is inserted into a positioning hole, for precise orientation and movement of the loading member.

15. The detecting apparatus of claim 14, wherein the seat plate defines a plurality of mounting holes, each pole is inserted into a mounting hole.

16. The detecting apparatus of claim 9, wherein the jacking mechanism further comprises a plurality of guiding rods and a plurality of guiding sleeves, each of the guiding sleeves is positioned on the supporting member, one end of each guiding rod is positioned on the seat plate, and the other end of each guiding rod is slidably positioned on corresponding guiding sleeve.

* * * * *